Sept. 3, 1963  L. E. MINICK  3,102,286
APPARATUS FOR THERMOPLASTIC SEALING
Filed April 20, 1961  5 Sheets-Sheet 1

INVENTOR.
LEE E. MINICK
BY
RICHEY, McNENNY & FARRINGTON
Donald W. Farrington
ATTORNEYS Sept. 3, 1963 L. E. MINICK 3,102,286
APPARATUS FOR THERMOPLASTIC SEALING
Filed April 20, 1961 5 Sheets-Sheet 2
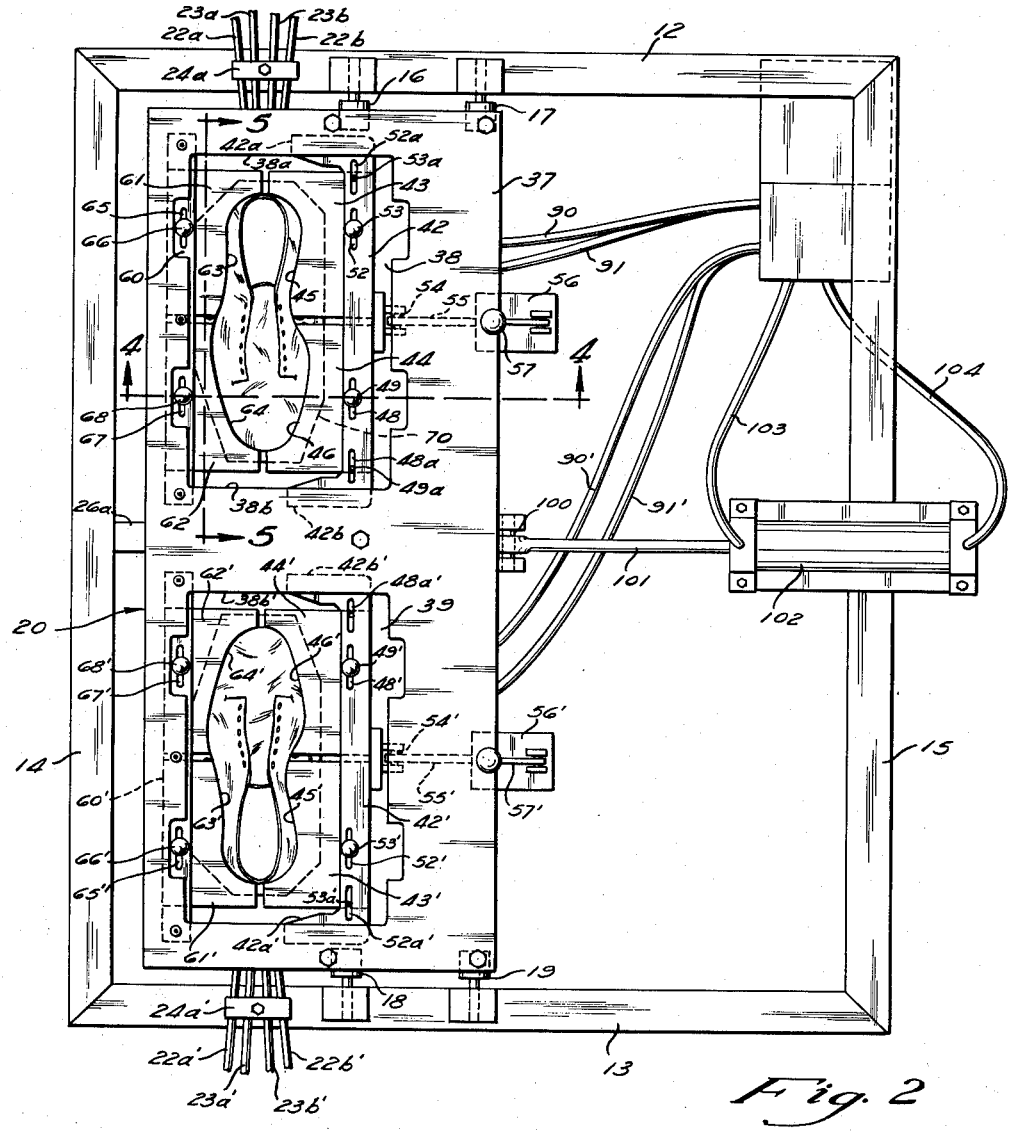
Fig. 2
Fig. 5
INVENTOR.
LEE E. MINICK
BY RICHEY, McNENNY, & FARRINGTON
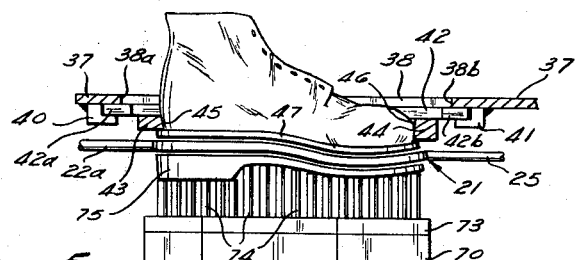
ATTORNEYS Sept. 3, 1963   L. E. MINICK   3,102,286
APPARATUS FOR THERMOPLASTIC SEALING
Filed April 20, 1961   5 Sheets-Sheet 3
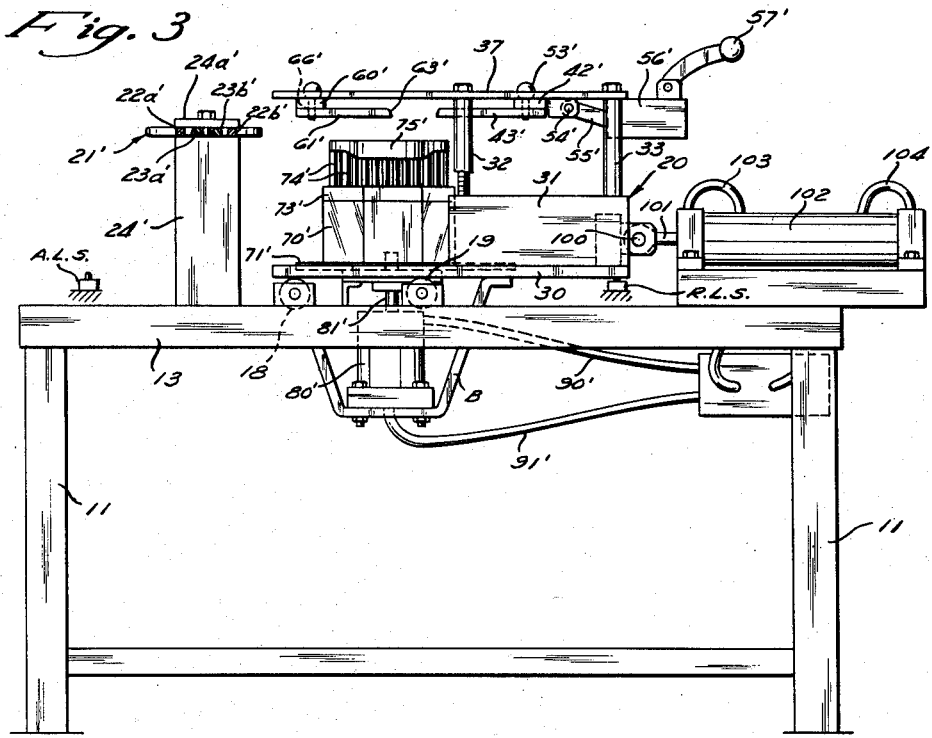
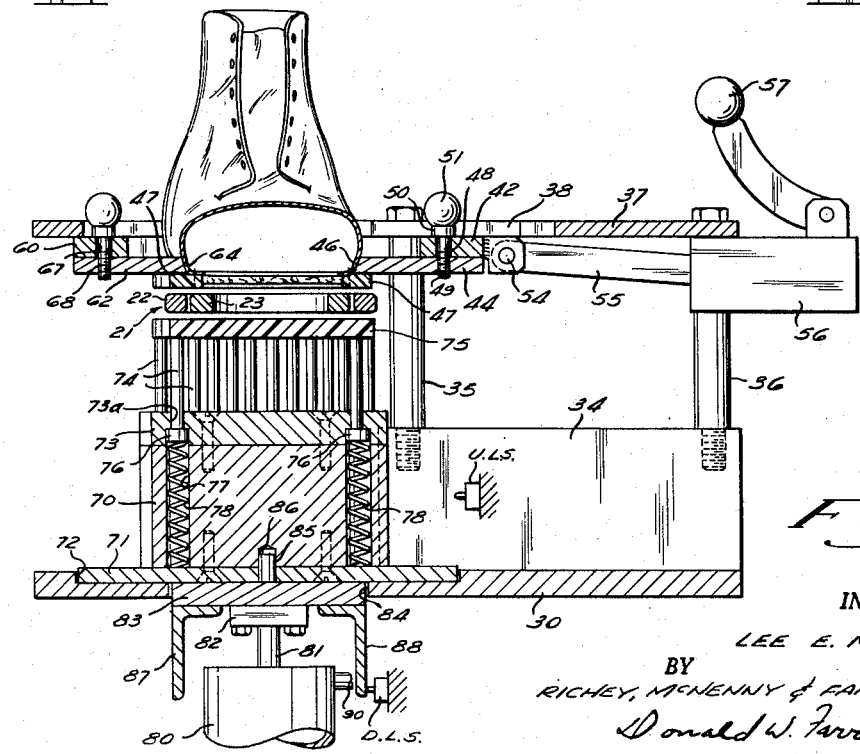
INVENTOR.
LEE E. MINICK
BY
RICHEY, McNENNY & FARRINGTON
Donald W. Farrington
ATTORNEYS

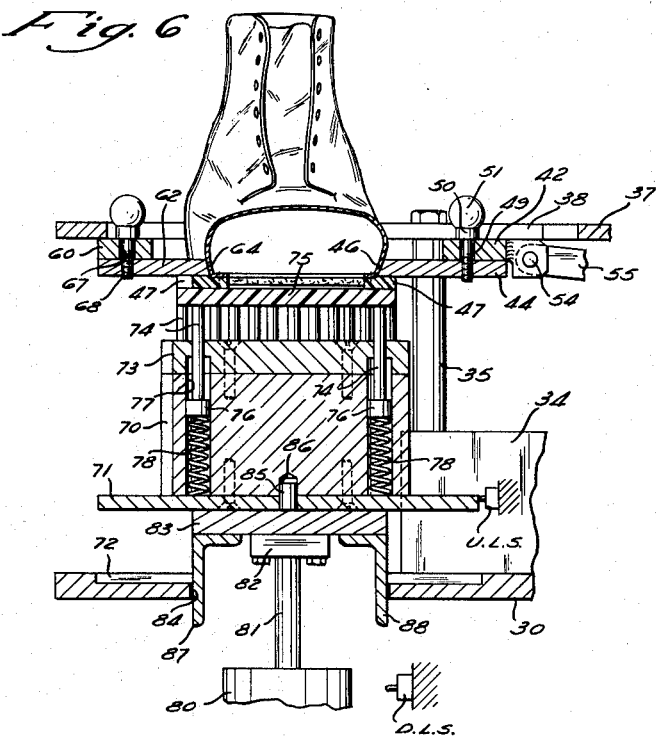

INVENTOR.
LEE E. MINICK
BY
RICHEY, McNENNY & FARRINGTON
Donald W. Farrington
ATTORNEYS

United States Patent Office 3,102,286
Patented Sept. 3, 1963

3,102,286
APPARATUS FOR THERMOPLASTIC SEALING
Lee E. Minick, Middlefield, Ohio, assignor to Pentron Electronics Corporation, Chicago, Ill., a corporation of Illinois
Filed Apr. 20, 1961, Ser. No. 104,410
6 Claims. (Cl. 12—33.2)

This invention relates to an apparatus for heat sealing two members together, especially a shoe sole of thermoplastic material and a shoe upper having a thermoplastic welt.

Prior to the present invention there has been a need for a quick and reliable apparatus for heat sealing a thermoplastic vinyl shoe sole to a shoe upper having a thermoplastic welt. One technique previously used for this purpose involves inserting a hot knife blade between the sole and the welt at several points around the edge of the sole. This tacks the sole to the shoe temporarily. Thereafter, the shoe is positioned in a fixture and the hot knife is inserted between the sole and the welt and is moved around the periphery of the shoe to melt the contiguous portions of the welt and sole and bond them to one another. This technique usually produces some charring of the thermoplastic material. Also, since the heat sealing is done manually by the operator, the sole may not be properly bonded to the shoe. Furthermore, because of the extensive manual operations involved, the production rate of this technique was not sufficiently rapid.

The present invention is directed to a novel and improved apparatus which avoids these difficulties and disadvantages.

In accordance with the preferred embodiment of the present invention, the shoe upper is releasably clamped in an upright position in a clamp mechanism, with the underside of its thermoplastic welt exposed. The thermoplastic shoe sole is positioned on a support below the clamp mechanism. Both the clamp mechanism and the sole support are on a carriage which is reciprocable horizontally by a power-operated mechanism whose operation is started by the operator. The carriage is advanced to a heating position in which the shoe upper and the sole are disposed directly above and below an electrical heater having an outline corresponding generally to that of the shoe. The heater heats simultaneously by radiant heat the underside of the welt and the upper surface of the sole, around the latter's periphery. The carriage is maintained in this position for a predetermined heating interval, after which it is automatically retracted away from the heater. Then, the sole support is moved up, pressing the heated sole against the welt so that they become bonded to one another. The heating and the subsequent bonding together of the sole and the welt on the shoe upper are performed automatically, so that no defects can occur due to human error, as would be true if these were manual operations performed by the operator.

It is an object of this invention to provide a novel and improved apparatus for heat sealing two members together.

It is also an object of this invention to provide such an apparatus which is particularly adapted for bonding a thermoplastic sole to a shoe upper.

Another object of this invention is to provide such an apparatus which carries out the heating and bonding operations automatically, thereby eliminating defects due to human error.

Another object of this invention is to provide such an apparatus which produces more reliably an effective bonding of the sole onto the shoe.

Another object of this invention is to provide such an apparatus which enables faster production of such shoes.

Further objects and advantages of this invention will be apparent from the following detailed description of a presently-preferred embodiment thereof, which is illustrated in the accompanying drawings.

In the drawings:

FIGURE 2 is a similar view of the apparatus with the shoe-supporting carriage advanced to the heating position;

FIGURE 3 is an end elevational view of the apparatus, viewed from the lower end of FIGURE 1;

FIGURE 4 is a vertical section taken along the line 4—4 in FIGURE 2;

FIGURE 5 is a view taken along the line 5—5 in FIGURE 2;

FIGURE 6 is a vertical section showing the sole raised up against the shoe upper;

FIGURE 7 is a fragmentary vertical section showing an alternative construction for the sole support in the present apparatus;

Figure 9:
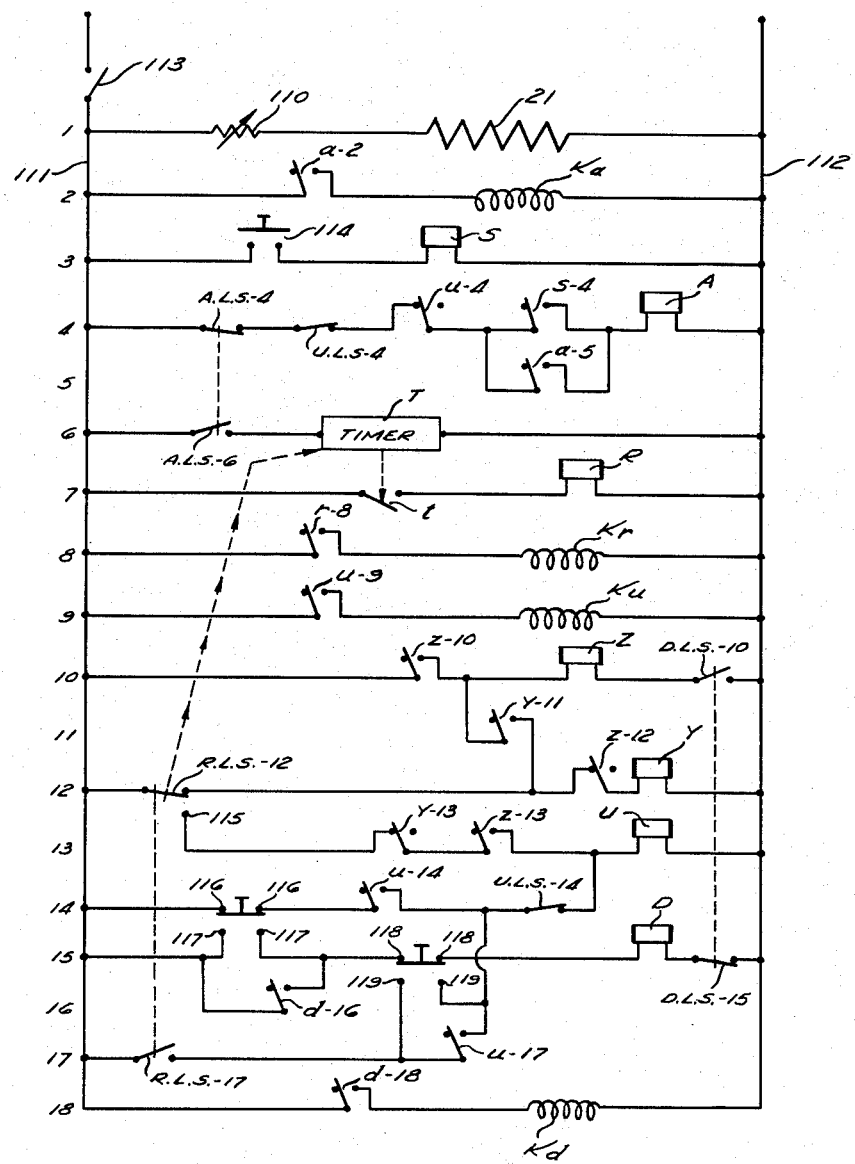

FIGURE 8 is a simplified schematic view showing the fluid connections for the fluid-operated mechanism which advances and retracts the carriage and for the fluid-operated mechanism which raises and lowers the sole support in the present apparatus; and FIGURE 9 is a schematic diagram of the electrical control circuit which controls the fluid-operated mechanisms for the carriage and the sole support arrangement in the present apparatus.

Figure 1:
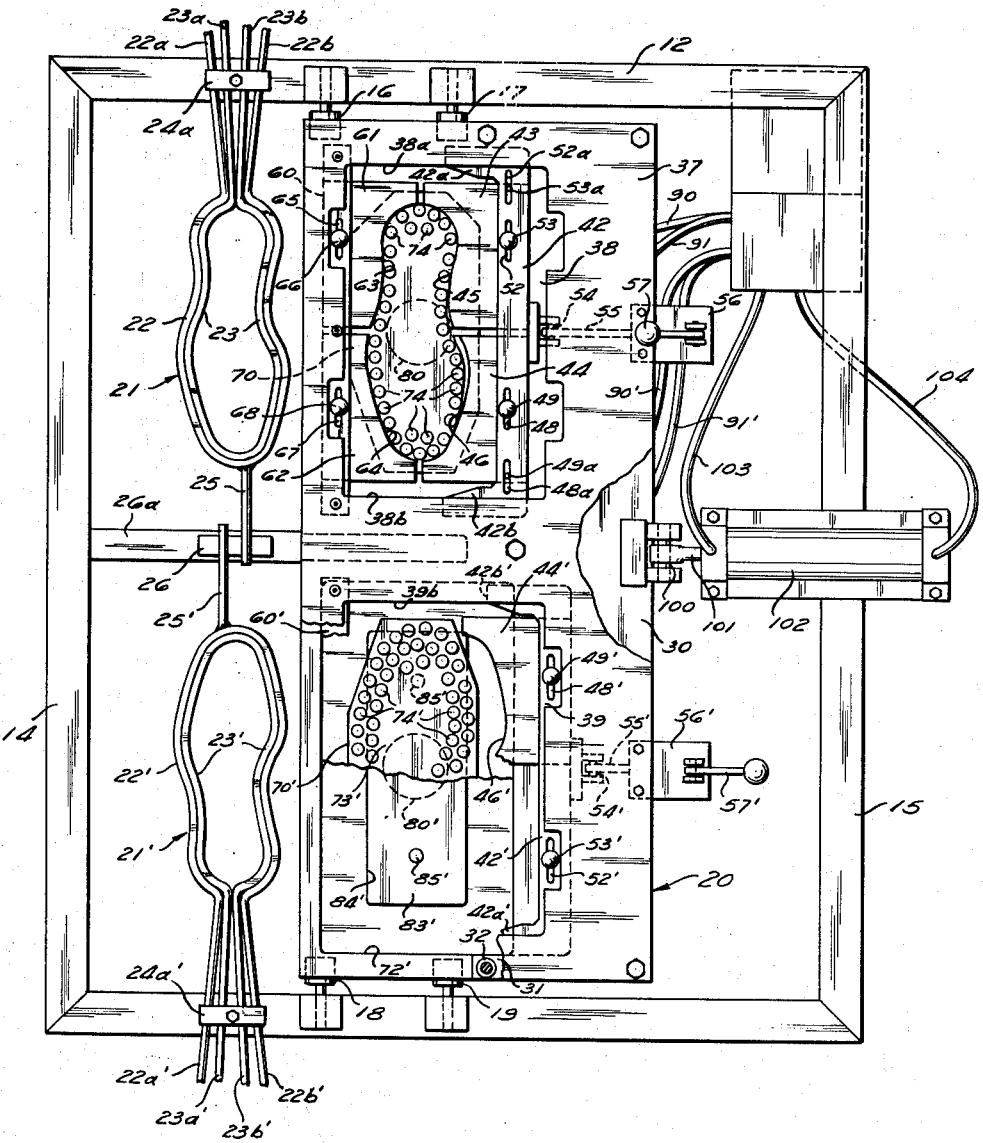
FIGURE 1 is a top plan view, with parts broken away, of the apparatus of the present invention with the shoe-supporting carriage retracted away from the heaters.

Referring first to FIGURES 1 and 2, the apparatus of the present invention is provided with an open supporting framework which includes upstanding legs 11 and a horizontal top frame composed of opposite side rails 12 and 13 and opposite end rails 14 and 15, which are interconnected to form an open rectangle.

As best seen in FIGURE 1, the side rail 12 provides a fixed support for a pair of horizontally aligned rollers 16 and 17. Similarly, the opposite side rail 13 of the framework provides a fixed support for a pair of rollers 18 and 19. A shoe carriage, designated in its entirety by the reference numeral 20 is supported by these rollers 16–19 for movement horizontally between a retracted position (FIGURE 1) and an advance position (FIGURE 2).

To the left of the carriage supporting rollers 16 and 17 in FIGURE 1, the side rail 12 provides a fixed support for a heater 21. As shown in FIGURE 1, this heater is made up of two electrically conductive wires 22 and 23 which extend contiguous to one another and which are shaped to conform substantially to the outline of the sole of a shoe. These wires are joined to each other, such as by soldering. They terminate in straight lead-in terminals 22a, 23a, 23b and 22b, which are all rigidly supported by a vertical column 24 which extends up from the side rail 12. As shown in FIGURE 1, the toe end of heater 21 has a straight wire rod 25 connected thereto and extending horizontally to a support column 26, which extends up from an intermediate rail 26a of the supporting framework. With this arrangement the heater 21 is supported in a generally horizontal position above the level of the top of the supporting framework.

A similar heater 21' is supported in the same fashion from the opposite side of the framework. The corresponding elements of this heater are designated by the same reference numerals with a "prime" added.

The shoe carriage comprises a flat bottom plate 30 which rides horizontally over the rollers 16–19. Adjacent the side rail 13 this plate supports an upstanding block 31 which, in turn, supports a pair of vertical, upstanding posts 32 and 33. At the opposite end of the carriage, adjacent the end rail 12, the bottom plate 30 of the carriage supports an identical block 34 (FIGURE 4) on which are mounted vertical, upstanding posts 35 and 36. These posts 32, 33, 35 and 36 provide a fixed support for the horizontal top plate 37 of the shoe carriage. As best seen in FIGURE 2, this top plate 37 is formed with a pair of generally rectangular openings 38 and 39, which are arranged to be positioned over the heaters 21 and 21′, respectively, when the carriage is advanced to the heating position (FIGURE 2).

As best seen in FIGURE 5, the carriage top plate 37 supports a depending channel member 40 adjacent the edge 38a of opening 38 which is nearest to the side rail 12. Similarly, at the opposite edge of this opening the top plate supports an identical, depending channel member 41. These channel members provide a support for the opposite ends of a slidable horizontal plate 42. As best seen in FIGURE 1, this plate has flanges 42a and 42b at its opposite ends which ride in these channels. The plate 42 extends from one end edge 38a of the opening 38 in the carriage top plate 37 to the opposite edge 38b of this opening. This plate is slidable laterally (from left to right and vice versa) of this opening for clamping a shoe upper in place and for releasing the shoe, as described in detail hereinafter.

Plate 42 carries a pair of front and back, shoe-engaging, horizontal plates 43 and 44. As best seen in FIGURE 2, the plate 43 has a curved inside edge 45 which is shaped to conform to the curvature of the inner side of the shoe at the heel end of the shoe. Plate 44 has a curved inside edge 46 which conforms substantially to the curvature of the front half of the shoe at the inside thereof. As shown in FIGURE 4, the plate 44 engages the shoe upper just above the welt 47. This is also true of the other plate 43.

To accommodate different shoe sizes both plates 43 and 44 are adjustable individually lengthwise of the plate 42 which carries them. Plate 42 has a first elongated slot 48 which slidably receives the shank of a bolt 49. The lower end of this bolt is threadedly received in an opening in plate 44, as best seen in FIGURE 4. Above the plate 42 the bolt presents an annular shoulder 50 and a rounded knob 51 which may be easily grasped by the operator. When it is desired to adjust the plate 44 lengthwise with respect to plate 42, so as to accommodate a different sized shoe, the bolt 49 is turned in a direction to loosen the clamping pressure which its shoulder 50 exerts on plate 42. Then the bolt 49 is slid lengthwise along slot 48 to the desired position, after which the bolt is again tightened against the plate 42 to secure plate 44 in place. A pin 49a carried by plate 44 is received in an elongated slot 48a in plate 42 to guide plate 44 when it is adjusted.

An identical arrangement of a slot 52 and bolt 53 and slot 52a and pin 53a are provided for plate 43, so that it is adjustable lengthwise of plate 42, toward and away from the other plate 44.

Plate 42 has a pivotal connection, by means of a cross pin 54, to a reciprocable linkage arm 55 which is operated by a toggle mechanism of conventional design enclosed within a housing 56 supported by the carriage top plate 37. The toggle is arranged to be operated by a pivoted handle 57 in the usual manner. When this handle is pivoted to the left, as shown in FIGURES 1, 2 and 4, it positions the plates 43 and 44 tightly against the inner side of the shoe upper. Conversely, when handle 57 is pivoted to the right, as shown in FIGURE 3, it retracts the plates 43 and 44 to the right, to release the shoe.

The carriage top plate 37 fixedly supports an elongated plate 60 at the opposite side of its opening 38. Plate 60 supports a pair of plates 61 and 62 for engagement with the outer side of the shoe upper. Plate 61 has an inside edge 63 which is shaped to conform substantially to the curvature of the outer side of the shoe upper at the back end of the shoe. Plate 62 has an inside edge 64 which is shaped to conform substantially to the outer side of the shoe upper at the latter's front end. Each of the plates 61 and 62 is adjustable lengthwise of plate 60 by means of slot and bolt connections 65, 66 and 67, 68 identical to those for plates 43 and 44.

In using this shoe clamp, before the shoe upper is inserted in the clamp, the handle 57 for the toggle mechanism is retracted to the right, so that plates 43 and 44 are retracted away from plates 61 and 62. The shoe upper is inserted from above down through the opening between these sets of clamping plates. The shoe upper is positioned with its welt 47 disposed just below the inside edges of plates 61 and 62. Then, the toggle handle 57 is pivoted to the left to move the inside plates 43 and 44 against the inner side of the shoe upper just above the welt 47 on that side of the shoe.

The sole for this shoe is supported from beneath by a support comprising a base which includes a block 70, a flat bottom plate 71 attached to the bottom of block 70, and a top cover plate 73 is attached to the top of the block 70. The bottom plate 71 is received in a recess 72 formed in the upper face of the carriage bottom plate 30. A plurality of individual pressure members in the form of spring-pressed rods 74 project up from the base of the sole support for engagement with the bottom face of the sole 75 around the latter's edges. (It will be noted that the sole 75 comprises the usual outsole of the shoe and a heel integral therewith.) The rods are slidably received in vertical bores 73a extending through the top cover plate 73. Enlarged heads 76 on the lower ends of these rods are slidably received in respective counterbores 77 which extend down into the block 70. Coil springs 78 are engaged under compression between the bottom plate 71 and these heads 76. Normally, these springs bias the rods 74 to their uppermost positions, as shown in FIGURE 4. The rods 74 are of different lengths as best shown in FIGURE 5, to accommodate the usual curvature of the bottom of the shoe sole 75. As best seen in FIGURE 1, the rods 74 are arranged in a pattern conforming substantially to the outline of the shoe, viewed from the top.

This sole support 70–74 is arranged to be raised and lowered by a piston operating in a cylinder 80. As shown in FIGURE 4, the shaft 81 of this piston carries a collar 82 which is bolted to a lift plate 83. The lift plate 83 is slidably received in an opening 84 formed in the bottom of the carriage bottom plate 30 and extending into the larger recess 72 which receives plate 71 on the sole support. The lift plate engages beneath the bottom plate 71 of the sole support. An upstanding pin 85 carried by the lift plate 83 is received in an opening 86 in the shoe pressure block to locate these members properly with respect to one another. The lift plate carries a pair of depending angle irons 87 and 88 at its opposite side edges to guide the lift plate properly when it is raised and lowered and to prevent it from turning.

The cylinder 80 is suitably supported from the carriage 20, as described in detail hereinafter, so that it moves back and forth in unison with the carriage and maintains a fixed position with respect to the sole support 70–74 which it operates.

The lift cylinder 80 is provided with a pair of hoses 90 and 91 connected respectively to its upper and lower ends. These hoses extend from a solenoid-operated selector valve V–1 (FIGURE 8) which has an air inlet supply 92 from a suitable source 93 of compressed air and an exhaust outlet 94 to the atmosphere. This valve is a multiple position, multi-port valve of known design having several different operating positions, including a neutral position in which both hoses 90 and 91 are out of communication with both the inlet 92 and the exhaust outlet 94, a first operating position in which the air hose 91 communicates with the air inlet 92 while the other hose 90 communicates with the exhaust outlet 94, and a second operating position in which the hose 90 communicates with the air inlet hose 92 and the other hose 91 communicates with the exhaust outlet 94. The valve is normally spring-centered in its neutral position. It is arranged to be operated alternatively by a pair of solenoids $K_u$ and $K_d$. When solenoid $K_u$ is energized the valve supplies air under pressure to the hose 91 to lift the piston while, at the same time, the upper end of cylinder 80 is connected through hose 90 to the exhaust outlet 94. Alternatively, when solenoid $K_d$ is energized, air under pressure is supplied to the cylinder above the piston, and at the same time air is exhausted from the lower end of the cylinder.

These solenoids are connected in the electrical control circuit shown schematically in FIGURE 9, whose operation will be described in detail hereinafter.

When the piston in cylinder 80 is in its down position, the sole support 70–74 is positioned at the level shown in FIGURES 4 and 5, from which it will be apparent that the shoe sole 75 is at a level just slightly lower than that of the corresponding heater 21.

When the piston in cylinder 80 is raised it moves this sole up against the welt 47 on the overlying shoe upper. As described in detail hereinafter, this takes place only when the carriage 20 is in its retracted position, as shown in FIGURE 1, with the shoe upper and the shoe sole positioned away from the heater 21.

The vertically reciprocable sole support 70–74 is arranged to operate an upper limit switch U.L.S. (FIGURES 4 and 6) when the sole support is at the top of its travel. Similarly, a down limit switch D.L.S. (FIGURES 4 and 6) is provided for operation by the sole support when the latter is in its lowermost position. These limit switches have contacts which are connected in the electrical control circuit of FIGURE 9, as described in detail hereinafter.

At the other opening 39 in the shoe carriage top plate 37, a clamping arrangement for a second shoe is provided. This clamping arrangement is identical to that already described, and hence it will not be described in detail.

The corresponding elements of this shoe clamping arrangement are given the same reference numerals, with a "prime" subscript added.

Below this shoe clamp arrangement there is provided an identical shoe sole support arrangement which is operated by a piston in a cylinder 80'. As shown in FIGURE 3, this cylinder is supported by a generally U-shaped bracket B which is attached to the underside of the bottom plate 30 of the carriage 20. It will be understood that the previously described air cylinder 80 is supported in the same manner from the carriage.

The air cylinder 80' has hoses 90' and 91' connected to its upper and lower ends respectively. The opposite ends of these hoses are connected to a solenoid-operated valve (not shown in FIG. 8) which is identical to the previously described valve $V_1$ and is connected to the air supply 93 in the same manner.

Upper and lower limit switches are provided in conjunction with this shoe sole support. For the sake of simplicity, the electrical circuit diagram of FIGURE 9 omits the solenoids and limit switches which are associated with the second shoe sole support. However, it is to be understood that the control arrangement for this sole support (at cylinder 80') is identical to that for the sole suport at cylinder 80, to be described in detail. These sole supports are raised and lowered in unison with one another.

As previously mentioned, the carriage 20 is reciprocable back and forth laterally of the supporting framework. To this end the carriage carries a cross pin 100 having a pivotal connection to a piston shaft 101. This shaft is connected to a piston operating in an air cylinder 102 which is fixedly mounted on the supporting framework. This cylinder is provided with hoses 103 and 104 connected to its opposite ends. The opposite ends of these hoses are connected to a valve $V_2$ of the same type as the previously described valve $V_1$. Valve $V_2$ has an air inlet connection 105 and an exhaust outlet 106. A pair of solenoids $K_a$ and $K_r$ are provided for controlling the operation of valve $V_2$ in the same manner as described in connection with valve $V_1$. When solenoid $K_a$ is energized the shoe carriage 20 will be advanced to the left in FIGURES 1–3. Alternatively, when solenoid $K_r$ is energized the shoe carriage will be retracted to the right in FIGS. 1–3.

The shoe carriage operates an advance limit switch A.L.S. (FIGURE 3) when the carriage is at the end of its advance movement (to the left in FIGURES 1–3). Also, there is a retract limit switch R.L.S. (FIGURE 3) which is operated by the carriage 20 at the end of the latter's retraction to the right in FIGURES 1–3.

Turning now to the electrical control circuit shown in FIGURE 9, this circuit is arranged to control the energization of the heater, the shoe carriage advance solenoid $K_a$, the shoe carriage retract solenoid $K_r$, the solenoid $K_u$ for raising the shoe sole support, and the solenoid $K_d$ for lowering the shoe sole support. The control circuit also includes relays for operating these solenoids and various contacts of the previously-mentioned limit switches.

Referring to FIGURE 9, the heater 21 is connected in series with an adjustable resistance 110 across the power lines 111 and 112. A manually operated switch 113 is connected in the power line 111 ahead of the heater 21. With this arrangement, the heater is energized as long as switch 113 is closed.

Line 2 of the control circuit in FIGURE 9 includes, in series, the advance solenoid $K_a$ and a set of normally closed relay contacts a–2, which are operated by relay A in line 4.

Line 3 of the control circuit includes, in series, a normally open, push-button operated start switch 114 and the coil of a start relay S.

Line 4 of this control circuit includes, in series, a set of normally closed contacts A.L.S.–4 of the advance limit switch A.L.S., a normally closed set of contacts U.L.S.–4 of the up limit switch U.L.S., a set of normally closed contacts u–4, which are operated by the up relay U in line 13, a set of normally open relay contacts s–4, which are arranged to be operated by the start relay S in line 3, and the coil of the advance relay A.

Line 5 includes a normally open set of holding contacts a–5 for the advance relay A, which are connected in parallel with the start relay contacts s–4.

Line 6 includes, in series, a set of normally open contacts A.L.S.–6 of the advance limit switch A.L.S. and a motor-operated timer T, which determines the time period during which the welt and the shoe sole are subjected to the heating action of the heater 21.

Line 7 of the control circuit includes a normally open timer switch t, which is arranged to be closed by the timer T at the end of the heating time interval, and the coil of the retract relay R.

Line 8 includes, in series, a normally open set of contacts r–8 of the retract relay (line 7) and the retract solenoid $K_r$.

Line 9 includes, in series, a normally open set of contacts u–9 of the up relay (line 13) and the up solenoid $K_u$.

Line 10 includes, in series, a set of relay holding contacts z–10, the coil of the corresponding relay Z, and a normally open set of contacts, D.L.S.–10, of the down limit switch D.L.S.

Line 12 of the control circuit includes, in series, a normally closed set of contacts R.L.S.–12 of the retract limit switch R.L.S., a normally closed set of the Z relay contacts z–12, and the coil of relay Y.

Line 11 contains a normally open set of contacts y–11 operated by relay Y and connected between the relay contacts z–10 in line 10 and the relay contacts z–12 in line 12.

Line 13 of the control circuit includes a normally open contact 115 of the retract limit switch R.L.S., a normally closed set of contacts y–13 operated by relay Y, a normally open set of contacts z–13 operated by relay Z, and the coil of the up relay U.

Line 14 of the control circuit includes normally closed contacts 116 of a push-button operated "down" switch, a normally open set of contacts u–14 operated by relay U, and a normally closed set of contacts U.L.S.–14 of the up limit switch U.L.S., all connected in series between the power line 111 and the relay U in line 13.

Line 15 of the control circuit includes, in series, the normally open contacts 117 of the down push-button switch, the normally closed contacts 118 of an up push-button switch, the coil of the down relay D, and a normally closed set of contacts D.L.S.–15 of the down limit switch D.L.S.

In line 16 of the control circuit a normally open set of holding contacts d–16 for the down relay D in line 15 are connected across the normally open contacts 117 of the down push-button switch.

Line 17 includes a set of normally open contacts R.L.S.–17 of the retract limit switch R.L.S. and a normally open set of contacts u–17 of the up relay U, connected in series between the power line 111 and the up limit switch contacts U.L.S.–14 in line 14.

In line 16 the normally open contacts 119 of the up push-button switch are connected in parallel with relay contacts u–17.

Line 18 of the control circuit includes, in series, a normally open set of contacts d–18 of the down relay D (line 15) and the down solenoid $K_d$.

*Operation*

For the sake of simplicity, the operation of the apparatus will be described only with reference to the shoe which is to be heated by heater 21.

Starting with the shoe carriage 20 in its retracted position and with the sole support arrangement 70–74 in its down position, the shoe upper is clamped in place between the plates 43, 44, 61, and 62 by manipulating the toggle handle 57, as already described. The shoe sole 75 is positioned on top of the pressure members 74, directly beneath this shoe upper. The shoe sole support arrangement 70–74 is in its down position at this time.

In order to insure that the shoe upper is properly positioned vertically so that it will clear the heater 21 when the shoe carriage is advanced, the sole support arrangement 70–74 is raised to push the shoe sole 75 up against the welt 47 and thereby push the welt snugly up against the bottom surfaces of the clamping plates, if it is not already so positioned.

The operator does this by depressing the up push-button switch (lines 15 and 16 of the control circuit in FIGURE 9). At this time, the carriage retract limit switch R.L.S.–17 will be closed because the shoe carriage 20 is in its retracted position. Also, the up limit switch contacts U.L.S.–14 in line 14 are closed because the shoe support 70–74 is in its down position.

By depressing the up push-button switch, the operator completes an initial energization circuit for the up relay U through the limit switch contacts R.L.S.–17, the now closed contacts 119 of the up push-button switch, and the limit switch contacts U.L.S.–14. When thus energized initially, relay U completes a holding circuit for itself through its contacts u–17 in line 17, so that relay U will remain energized after the up push-button switch is released. The energization of the up relay U energizes solenoid $K_u$ in line 9, because of the closing of the up relay contacts u–9. Solenoid $K_u$ operates valve $V_1$ to supply air under pressure beneath the piston in cylinder 80 so as to raise the shoe sole support 70–74.

This shoe sole support moves up until it opens the up limit switch contacts U.L.S.–14, thereby de-energizing the up relay U and the up solenoid $K_u$. When this happens, valve $V_1$ is restored to its neutral position.

The operator may now lower the shoe sole support 70–74 by depressing the down push-button switch in lines 14 and 15. This completes an initial energization circuit, by way of line 15, for the down relay D, which energizes the down solenoid $K_d$ in line 18. When initially energized, relay D completes a holding circuit for itself through its set of contacts d–16, so that it will remain energized even after the down push-button switch is released. Solenoid $K_d$ operates valve $V_1$ to supply air under pressure to the upper end of cylinder 80 and to exhaust air from below the piston in the cylinder, so that the piston and the shoe sole support arrangement 70–74 move down. When the shoe sole support moves down sufficiently far it opens the down limit switch contacts D.L.S.–15 in line 15, thereby de-energizing the down relay D and the down solenoid $K_d$.

The shoe carriage 20 now may be advanced (to the right in FIGURES 1–3) to the heating position shown in FIGURE 2. This is done by the operator's depressing the normally open start switch 114 in line 3. This energizes the start relay S which, in turn, completes an initial energization circuit for the advance relay A by way of line 4. After being initially energized in this manner, relay A completes a holding circuit for itself through its set of contacts a–5, so that this relay will remain energized even after the start switch 114 has been released. The energization of the advance relay A closes its contacts a–2 in line 2, energizing the carriage advance solenoid $K_a$. This solenoid operates the valve $V_2$ to supply air under pressure to the back end of the carriage cylinder 102, at the same time exhausting air from the front end of the cylinder, so that the piston in this cylinder advances the shoe carriage 20 toward the heater 21.

The horizontal advance of the carriage 20 to the heating position continues until it operates the advance limit switch, which has sets of contacts in lines 4 and 6 of the FIGURE 9 control circuit. The opening of the limit switch contacts A.L.S.–4 de-energizes the advance relay A, which in turn de-energizes the advance solenoid $K_a$. Therefore, the shoe carriage 20 stops. At the same time, the closing of the advance limit switch contacts A.L.S.–6 completes an energization circuit for the timer T. The timer operates for a predetermined time, such as twenty or thirty seconds, during which time period the welt 47 on the shoe upper and the shoe sole 75 are positioned directly above and below the heater 21 (FIGURE 4) in sufficiently close proximity to the heater that they become heated by radiant heat to a plastic state around the edge of the shoe.

At the end of this time, the timer T closes its switch t in line 7, thereby completing an initial energization circuit for the carriage retract relay R. This relay, in turn, operates its set of contacts r–8 in line 8 to energize the carriage retract solenoid $K_r$. Solenoid $K_r$ operates valve $V_2$ to retract the shoe carriage 20 horizontally away from the heater 21.

The horizontal retraction of the shoe carriage continues until it operates the retract limit switch, which has contacts in lines 12 and 17. R.L.S.–12 closes on contact 115 in line 13 to complete an initial energization circuit for the up relay U. Also, it re-sets the timer T to its starting condition.

In line 13 the Y relay contacts y–13 and the Z relay contacts z–13 will be closed because of the preliminary operation of relays Y and Z, which have taken place as follows:

With the retract limit switch contact R.L.S.–12 in the normal position due to the advance of carriage 20, as shown in FIGURE 9, relay Y in line 12 will have been energized. This relay closes its set of contacts y–11 in line 11, which completes an initial energization circuit for relay Z in line 10. Relay Z therefore opens its contacts z–12 in line 12 to de-energize relay Y. Also, it closes its z–10 contacts in line 10 to provide a holding circuit for itself. As a result of this preliminary action, which has taken place before the retract limit switch has been operated by the retraction of the shoe carriage, the y and z contacts in line 13 will be closed.

When the up relay is energized, as described, it energizes solenoid $K_u$, which operates valve $V_1$ to move the shoe sole support 70–74 up. The initial energization of the up relay U completes a holding circuit for itself through its $u$–14 contacts in line 14. This holding circuit is necessary because the down limit switch contacts D.L.S.–10 in line 10 will open when the shoe sole support 70–74 moves up, thereby de-energizing relay Z and opening the initial energization circuit, via line 13, for relay U.

Relay U stays energized until the up limit switch U.L.S.–14 in line 14 is opened at the upper end of the travel of the shoe sole support 70–74. When this happens, the up relay U and the up solenoid $K_u$ become de-energized.

The shoe sole support will have been raised to the position shown in FIGURE 6. From this figure it will be apparent that the shoe sole is resiliently pressed against the welt on the shoe upper, the individual pressure members being retracted against the bias of the associated springs 78. Since both the welt and the shoe sole are still in a somewhat plastic condition adjacent the edges at their abutting faces, the sole will become bonded to the welt.

After the sole has been applied to the shoe, the operator manually depresses the down push-button switch (lines 14 and 15) to complete an initial energization circuit through line 15 for the down relay D. This energizes the down solenoid $K_d$, which operates valve $V_1$ to lower the sole support 70–74. The initial energization of the down relay D completes a holding circuit for itself through its contacts in line 16, so that the operator may release the down push-button switch.

As the shoe sole support moves down, the shoe sole 75 remains bonded to the shoe upper.

The sole support 70–74 moves down until it operates the down limit switch, opening the latter's contacts D.L.S.–15 in line 15 and closing its contacts D.L.S.–10 in line 10.

Thereafter, the operator may remove the completed shoe from the clamp on the shoe carriage.

An automatic repeat of the up stroke of the sole support 70–74 cannot occur because relay Y cannot be energized again until the shoe carriage 20 moves away from its retracted position, so as to permit the retract limit switch R.L.S.–12 to assume the normal condition shown in FIGURE 9 at line 12.

The control circuit incorporates a safety interlock which prevents the sole support 70–74 from being moved up when the carriage 20 is not in its retracted position. This is provided by the retract limit switch contacts R.L.S.–17 in line 17, which open when the carriage is not in its fully retracted position. This prevents the energization of the up relay U by the operation up push-button switch in lines 15 and 16 at this time.

The circuit also incorporates safety interlocks which prevent the carriage 20 from being advanced toward the heater except when the sole support 70–74 is in its down position.

At all times when the shoe sole support 70–74 is moving up, relay U is energized. This opens the energization circuit in line 4 for the advance relay A, so that the carriage 20 cannot be advanced horizontally as long as the shoe sole support is moving up.

Also, when the shoe sole support 70–74 is in its uppermost position, the up limit switch contacts U.L.S.–4 in line 4 are open. This prevents energization of the advance relay A while the shoe sole support is in its uppermost position.

Also, when the shoe sole support is being lowered, relay U is de-energized because its initial energization circuit through line 13 and its holding circuit through line 14 both have been broken, as described. This breaks the energization circuit for the advance relay A in line 4, so that the carriage cannot be advanced horizontally while the shoe sole support is being lowered.

FIGURE 7 shows an alternative construction for the shoe support in which the individual presser rods 74 have reduced, integral, screw-threaded stems 174 on their upper ends. Cylindrical nuts 175 are threaded onto these stems. These nuts enlarge the area of engagement of the presser members against the bottom of the sole, so that the sole is supported almost continuously around its marginal edge.

From the foregoing description it will be apparent that the illustrated embodiment is particularly well adapted for accomplishing the stated objects of this invention. However, while a presently-preferred embodiment has been described in detail and shown in the accompanying drawings, it is to be understood that the invention is susceptible of various other embodiments.

What is claimed is:

1. Apparatus for heat sealing a shoe sole of thermoplastic material to a shoe upper having a thermoplastic welt comprising a clamp mechanism for supporting the shoe upper comprising a first pair of members for engagement with one side of the shoe upper, said members having inside edges for engagement with said side of the shoe upper just above the welt thereon, means for selectively adjusting the members of said first pair toward and away from one another lengthwise of the shoe upper to accommodate different sized shoes, means fixedly supporting said first pair of members laterally with respect to the shoe upper, a second pair of members for engagement with the opposite side of the shoe upper, the members of said second pair having inside edges for engagement with said last-mentioned side of the shoe upper just above the welt thereon, means for selectively adjusting the members of said second pair toward and away from one another lengthwise of the shoe upper, and means for moving the members of said second pair laterally toward and away from said first pair of members to releasably clamp the shoe upper between said first and second pairs of members.

2. Apparatus for heat sealing a shoe sole of thermoplastic material to a shoe upper having a thermoplastic welt comprising a heater, a shoe carriage reciprocable toward and away from the heater, and a clamp mechanism on the carriage for supporting the shoe upper comprising a first pair of members for engagement with one side of the shoe upper, said members having inside edges which conform generally to said side of the shoe upper just above the welt thereon, means for selectively adjusting the members of said first pair toward and away from one another lengthwise of the shoe upper to accommodate different sized shoes, means fixedly supporting said first pair of members laterally with respect to the shoe upper, a second pair of members for engagement with the opposite side of the shoe upper, the members of said second pair having inside edges which conform generally to said last-mentioned side of the shoe upper just above the welt thereon, means for selectively adjusting the members of said second pair toward and away from one another lengthwise of the shoe upper, and means for moving the members of said second pair in unison laterally toward and away from said first pair of members to releasably clamp the shoe upper between said first and second pairs of members.

3. Apparatus for heat sealing a shoe sole of thermoplastic material to a shoe upper having a thermoplastic welt comprising a shoe sole support comprising a base, a plurality of separate pressure members extending up from said base and positioned to engage different portions of the shoe sole around the latter's marginal edge, and spring means biasing said pressure members upwardly, said pressure members being retractable downwardly with respect to said base against the bias of said spring means.

4. Apparatus for heat sealing together a thermoplastic shoe sole and a shoe upper having a thermoplastic welt comprising an electrical heater having a contour corresponding to the outline of the shoe at the bottom, a carriage movable toward and away from the heater, a clamp mechanism on said carriage for supporting the shoe upper, a sole support on the carriage for supporting the shoe sole below said clamp mechanism, means for advancing said carriage to position the welt on the shoe upper and the sole above and below said heater to be heated simultaneously thereby means for retracting the carriage after the welt and the sole have been heated, said sole support comprising a base, a plurality of separate pressure members extending up from said base and engaging the bottom of the sole around the latter's periphery, and springs biasing said pressure members upwardly individually, and means for raising said sole support up toward said clamp mechanism to press the sole against the welt, said pressure members being retractable downwardly against the bias of said springs when the sole is pressed against the welt.

5. In an apparatus for heat sealing a shoe sole of thermoplastic material to a shoe upper having a thermoplastic welt, a heater, a shoe carriage reciprocable toward and away from the heater, a clamp mechanism on said shoe carriage for supporting the shoe upper in an upright position comprising a first pair of members for engagement with one side of the shoe upper, said members having inside edges which conform generally to said side of the shoe upper just above the welt thereon, means for selectively adjusting the members of said first pair toward and away from one another lengthwise of the shoe upper to accommodate different sized shoes, means for fixedly supporting said first pair of members laterally with respect to the shoe upper, a second pair of members for engagement with the opposite side of the shoe upper, the members of said second pair having inside edges which conform generally to said last-mentioned side of the shoe upper just above the welt thereon, means for selectively adjusting the members of said second pair toward and away from one another lengthwise of the shoe upper, and means for moving the members of said second pair in unison laterally toward and away from said first pair of members to releasably clamp the shoe upper between said first and second pairs of members, and a support for the shoe sole on said carriage below said clamp mechanism, said support comprising a base, a plurality of separate pressure members extending up from said base and positioned to engage the bottom of the shoe sole at different portions of the latter's marginal edge, spring means biasing said pressure members upwardly, and means for moving said base upwardly to press the shoe sole against the welt on the shoe upper in said clamp mechanism, said pressure members being retractable downwardly with respect to the base against the bias of said spring means as the shoe sole is pressed against the welt on the shoe upper.

6. Apparatus for heat sealing together a thermoplastic shoe sole and a shoe upper having a thermoplastic welt comprising a heater, a carriage mounted for movement toward and away from the heater, a clamp mechanism on the carriage for supporting the shoe upper, a shoe sole support on the carriage for supporting the shoe sole in spaced confronting relationship to the welt on the shoe upper, power-operated means for advancing and retracting the carriage toward and away from the heater, means controlled by the operator for initiating the operation of said power-operated means to advance the carriage toward the heater, means for automatically stopping the carriage in its advanced position with the welt and the sole positioned above and below the heater to be heated thereby, means for automatically operating said power-operated means to retract the carriage after a predetermined interval at said advanced position, and means for automatically raising said shoe support to press the heated sole against the welt after the carriage has been retracted.

References Cited in the file of this patent

UNITED STATES PATENTS

| | | |
|---|---|---|
| 2,342,725 | Crepeau | Feb. 29, 1944 |
| 2,401,277 | Stratton | May 28, 1946 |
| 2,501,789 | Senfleben | Mar. 28, 1950 |
| 2,549,981 | Maeser et al. | Apr. 24, 1951 |
| 2,766,467 | Juhola et al. | Oct. 16, 1956 |
| 2,789,295 | Rollman et al. | Apr. 23, 1957 |
| 2,799,034 | Crowell et al. | July 16, 1957 |